(12) United States Patent
Van Gorder

(10) Patent No.: X7872
(45) Date of Patent: Dec. 16, 1833

(54) WATER WHEEL

(76) Inventor: Isaac Van Gorder

Isaac Van Gorder of Trumbull Co Ohio

Letters Patent.

The Schedule referred to in these Letters Patent and making part of the same containing a description in the words of the said Isaac Van Gorder himself of his Improvement in water mill Wheels.

To all to whom these presents shall come. Be it known that I, Isaac Van Gorder of Trumbull County and State of Ohio, have invented a new and useful improvement in the water wheels of mills, which improvement consists in the application of water to mill wheels formed as is hereinafter described, for the purpose of creating a rapid fast motion. by force of the [illegible] gravitation and motion of the water applied. and that the following is a full and exact description of the said invention or improvement, as invented or improved by me. When the head of water to be used is about ten feet, the body of the wheel may be two feet diameter & eight inches thick made out of a solid piece of green timber the grain of which should be parallel to the axis. this may be of wood about three feet long and eight inches diameter furnished with a step gudgeon at the [illegible] and at the upper end, with a clipper or coupling gudgeon to allow the axis or shaft to be [illegible] out to any desired length, or the shaft may be entire and of the whole length desired. on this the wheel should be hung at or about six inches from its lower end.

In the step gudgeon there should be a concave or socket about one inch deep that would fit on a convex point or end of an upright post or stake set in a bridge or piece of wood about ten or eight inches square, and long enough to be fastened at its ends to the flume or case herein after described.

The aforesaid convex point and socket should be hardened steel; the upright post, or stake may be of the same material, or of iron. upon the periphery of the wheel fix at regular distances about twenty buckets making them about two and a half inches broad each, and about eleven inches deep each, of tough rolled iron at least one quarter of an inch thick.

These buckets should be curved in their depth the radius of the curve being about eleven inches. The edges of the pieces of iron that form the buckets then are to be placed against and fixed in the
rim or periphery of the wheel must be also curved so as to fit
close to said rim. The upper ends of the buckets should be level
with the top of the wheel, and the buckets should be so placed that
the water may flow or strike against their upper or concave side.
They should be secured firmly to the wheel by screws or bolts passed
through the upper and lower ends of the pieces of iron, forming
said Buckets near the inner edge of said ends. the said pieces being
cut wider at their ends than elsewhere to allow them to be let
into saw kerfs cut into the rim of the wheel near the top and
bottom thereof. When the buckets are formed their outer edg-
es must be turned or otherwise brought as by filing to a true circle
The wheel having been thus made a strong wooden frame is next
to be formed and cased so as to be perfectly tight, with plank two
inches and a half thick on its top and sides and on its bottom
with plank two inches thick crossed or lapped together four times
whilst green & firmly nailed or pinned to each other. Through this
bottom cut a circular hole or curb sufficiently large to allow the
wheel and its buckets to revolve therein freely. This curb may be
lined or cased with sheet iron. But before the top of said case
is fastened or put on, a platform or guard should be made of
green plank doubled or crossed and nailed or pinned together
about three inches thick which platform should rest on the up-
per surface of the bottom of said case in the centre of this of
~~this~~ platform a hole must be cut of circular form of equal di-
ameter in the lower surface with the diameter of the hole in the
curb but [illegible] greater diameter by two inches on the upper
surface in this hole saw kerfs should be cut into which pie-
ces of rolled iron of about an eighth of an inch thick must
be let so as to form chutes or guides in number corresponding
to the buckets of the wheel, but they are to be placed or incli-
ned in an opposite direction to the inclination of the buckets
and so as to form an angle of about 30 degrees below the horizon tal line. The inner edges of the pieces of iron forming the shutes are to be let into saw kerfs cut into a cylindrical center of green plank doubled and pinned together three inches thick. the diameter of which should be precisely the same as that of the body of the wheel. the said center being connected with the platform by said shutes or pieces of iron and also by three strong iron bolts. and having a hole cut in its middle thro' which the axis or shaft of the wheel may revolve and thus forming a guard to the wheel. The parts herein before described being constructed as aforesaid. and adjusted so that those which are to move may work without any unavoidable friction. the water may be conveyed by a trunk into the side or top of the case above the level of the upper surface of the platform or guard and be let on by drawing. or be shut off by closing a gate that should be placed at the top of the trunk. The revolutions which a wheel will make, if constructed as aforesaid and driven by a head of ten feet of water would exceed two hundred in a minute.

This wheel however may be made to run in other than horizontal directions. it may be placed vertically or at any desirable angle. and it as well as the case may be made of cast iron instead of wood or partly of each and it will run as well when placed near to the top of the head of water as if placed lower. provided a tight trunk or case shall be continued from the bottom of the case or flume beneath the surface of the tail or waste water; This wheel will run as well in three or under the water as out of it and may be protected from the weather by being emerged in it. under a sixteen feet head of water three hundred revolutions of this wheel may be had in a minute.

By varying the diameter of the wheel and its depth, and enlarging or contracting the issuing ends of the buckets - and the breadth and depth and curvatures or angles of the buckets the velocity of the wheel may be increased or diminished and

United States Patent

Patent No.: X7872 the water power ~~may~~ be applied as may be most advantageous &
conformable to the objects of the persons employing this invention
and its revolutions may be varied from one hundred to three hun
dred ~~to three hundred~~ per minute so as in most cases to obviate
the necessity and save the expense of the gearing required to get
up speed. And power may be augmented by putting two
wheels having opposite issues within the case or flume on the
same axis and still more by putting additional cases or flum
with pairs of wheels thereon.

What I claim as my invention or improvement is the con
struction of a water wheel to run in a curb or cylinder as above
described protected by a platform or guard from the weight or
pressure of the column of water employed and defending
the axis of the wheel from the excessive friction which that
weight or pressure would create at or on the pivot of said axis
also the manner of applying water at the periphery of a wheel
thro' shutes or guides placed in a protecting platform or guard
so as to impel a wheel within a curb or cylinder and flume
or case per force of the percussion gravitation and reaction of the
water applied

Isaac Van Gordon

Exd. Witnesses
Hyde James Wm McCulloh
Saml. Tschudy (1508 Words)

(Granted Dec. 16. 1833)